US012603367B2

(12) United States Patent
Hwang et al.

(10) Patent No.: US 12,603,367 B2
(45) Date of Patent: Apr. 14, 2026

(54) SECONDARY BATTERY POUCH

(71) Applicant: SK On Co., Ltd., Seoul (KR)

(72) Inventors: Chang Mook Hwang, Daejon (KR); Sin Young Moon, Daejeon (KR); Yoon Ji Jo, Daejeon (KR)

(73) Assignee: SK On Co., Ltd., Seoul (KR)

( * ) Notice: Subject to any disclaimer, the term of this patent is extended or adjusted under 35 U.S.C. 154(b) by 282 days.

(21) Appl. No.: 17/383,409

(22) Filed: Jul. 22, 2021

(65) Prior Publication Data

US 2022/0029231 A1     Jan. 27, 2022

(30) Foreign Application Priority Data

Jul. 22, 2020     (KR) ........................ 10-2020-0091228

(51) Int. Cl.
H01M 10/42          (2006.01)
H01M 50/105         (2021.01)
                (Continued)

(52) U.S. Cl.
CPC ....... H01M 50/184 (2021.01); H01M 50/105 (2021.01); H01M 50/119 (2021.01);
                (Continued)

(58) Field of Classification Search
CPC ............. H01M 50/105; H01M 50/122; H01M 50/133; H01M 50/184; H01M 50/394; H01M 50/178; H01M 50/198; H01M 50/325; H01M 50/342; H01M 50/124; H01M 50/136
See application file for complete search history.

(56) References Cited

U.S. PATENT DOCUMENTS

2012/0288746 A1*  11/2012  Abe .................. H01M 10/0413
                                              29/623.2
2017/0012252 A1*   1/2017  Yoo ..................... H01M 50/186
                        (Continued)

FOREIGN PATENT DOCUMENTS

JP          2006079858 A      3/2006
KR        20100118394 A      11/2010
                        (Continued)

OTHER PUBLICATIONS

EP21186982.1 European Search Report dated Dec. 15, 2021, 8 pgs.
Office Action for Korean Patent Application No. 10-2020-0091228 issued by the Korean Patent Office on May 1, 2025.

*Primary Examiner* — Allison Bourke
*Assistant Examiner* — Charlene Bermudez
(74) *Attorney, Agent, or Firm* — IP & T GROUP LLP

(57)                    ABSTRACT

Embodiments provide a secondary battery pouch including a sealing portion formed at an outside of the secondary battery pouch constituting a battery cell and configured to seal an inner space of the secondary battery pouch. The sealing portion includes: a first fusion portion having a smallest thickness in the sealing portion; and a second fusion portion having a largest thickness in the sealing portion. The first fusion portion and the second fusion portion are continuously formed at least one time alternately in a direction from an innermost side of the sealing portion in contact with the inner space of the secondary battery pouch to an outer side of the sealing portion.

5 Claims, 6 Drawing Sheets

(51) Int. Cl.

| | | |
|---|---|---|
| *H01M 50/119* | (2021.01) | |
| *H01M 50/121* | (2021.01) | |
| *H01M 50/126* | (2021.01) | |
| *H01M 50/183* | (2021.01) | |
| *H01M 50/184* | (2021.01) | |
| *H01M 50/186* | (2021.01) | |
| *H01M 50/342* | (2021.01) | |

(52) U.S. Cl.
CPC ....... *H01M 50/121* (2021.01); *H01M 50/126* (2021.01); *H01M 50/186* (2021.01)

(56) References Cited

U.S. PATENT DOCUMENTS

| | | | |
|---|---|---|---|
| 2018/0233722 A1 | 8/2018 | Holman et al. | |
| 2020/0028128 A1 | 1/2020 | Hwang et al. | |
| 2020/0194737 A1* | 6/2020 | Yasuda | H01M 50/183 |
| 2020/0203676 A1 | 6/2020 | Yoon et al. | |

FOREIGN PATENT DOCUMENTS

| | | |
|---|---|---|
| KR | 101165066 B1 | 7/2012 |
| KR | 101250901 B1 | 4/2013 |
| KR | 20160080559 A | 7/2016 |
| KR | 10-2018-0128777 A | 12/2018 |
| KR | 101925982 B1 | 12/2018 |
| WO | 2011089965 A1 | 7/2011 |
| WO | 2017082669 A1 | 5/2017 |

* cited by examiner

FIG.5A

SECONDARY BATTERY POUCH

CROSS REFERENCE TO RELATED APPLICATION

The present application claims priority to Korean Patent Application No. 10-2020-0091228, filed Jul. 22, 2020, the entire contents of which is incorporated herein for all purposes by this reference.

BACKGROUND OF THE INVENTION

Field of the Invention

The present disclosure relates generally to a secondary battery pouch. More particularly, the present disclosure relates to a secondary battery pouch that effectively responds to gas generated in the secondary battery pouch by controlling the degree of fusion of a sealing portion formed by fusing together an upper sheet at an upper position of the secondary battery pouch and a lower sheet at a lower position of the secondary battery pouch.

Description of the Related Art

Chargeable and dischargeable secondary batteries are widely used as energy sources or auxiliary power devices of mobile devices. Secondary batteries are also attracting attention as power sources for electric vehicles (EV), hybrid electric vehicles (HEVs), and plug-in hybrid electric vehicles (Plug-In HEVs), which are proposed as solutions for air pollution from existing gasoline vehicles and diesel vehicles that use fossil fuels. With the technology development of mobile devices and their increasing demands, the demand for secondary batteries as energy sources is rapidly increasing. Among these secondary batteries is a lithium secondary battery having high energy density and discharge voltage, on which many studies have been conducted and which have been commercially and widely used.

Depending on their appearance, the lithium secondary battery may be largely classified into a cylinder-type battery, a prismatic-type battery, and a pouch-type battery. Depending on the type of electrolyte, the lithium secondary battery may also be classified into a lithium-ion battery, a lithium-ion polymer battery, and a lithium polymer battery.

With the recent trend toward miniaturization of mobile devices, there is an increasing demand for a prismatic-type battery and a pouch-type battery, which have a small thickness. In particular, great interest is being shown in a pouch-shaped battery that is easy to modify in shape, inexpensive to manufacture, and light in weight.

In general, a pouch-type battery is a battery that is manufactured from a laminate sheet for a pouch, the laminate sheet including an inner resin layer, a metal layer, and an outer resin layer, and includes a storage space in which an electrode assembly and an electrolyte are accommodated, and a sealing portion sealed around the electrode assembly. Examples of the electrode assembly accommodated in the storage space may include a jelly-roll type (wound type) electrode assembly, a stack type electrode assembly, or a combination type (stack/folding type) electrode assembly.

When the pouch-type battery is overcharged, exposed to high temperature, or internally short-circuited, a large amount of gas is generated due to decomposition of an electrolyte, with the result that a battery case swells, i.e., a so-called swelling phenomenon occurs. This swelling phenomenon may cause a high pressure inside the sealed case, while further promoting the decomposition of the electrolyte, resulting in an explosion of the battery. In addition, the generated gas may cause a central portion of the battery case to swell, causing the battery to be deformed. This may result in a short circuit of the battery, which is problematic.

In a related-art pouch-type battery, due to the fact that the sealing characteristics are directly related to the durability of a cell, the durability of the battery may be reduced due to a line or a separate device for releasing gas. Therefore, attempts have been made to increase the sealing force in order to delay the venting time in which the gas generated from the battery is released or to prevent venting by thickening a PP layer inside a pouch.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent document 1) Korean Patent No. 10-1165066 B1

SUMMARY OF THE INVENTION

Accordingly, the present disclosure has been made keeping in mind the above problems occurring in the related art, and an objective of the present disclosure is to, when gas is generated inside a sealed pouch and high pressure is formed thereby, allow the space inside the pouch to gradually expand in a stepwise manner, thereby preventing a swelling phenomenon and increasing the stability of a battery.

In order to achieve the above objective, an aspect of the present disclosure provides a secondary battery pouch including: a sealing portion formed at an outside of the secondary battery pouch constituting a battery cell and configured to seal an inner space of the secondary battery pouch, wherein the sealing portion may include: a first fusion portion having a smallest thickness in the sealing portion; and a second fusion portion having a largest thickness in the sealing portion, wherein the first fusion portion and the second fusion portion may be continuously formed at least one time alternately in a direction from an innermost side of the sealing portion in contact with the inner space of the secondary battery pouch to an outer side of the sealing portion.

In the secondary battery pouch according to the aspect of the present disclosure, the sealing portion may be formed by fusion of the upper sheet and the lower sheet, and the second fusion portion may be formed at the innermost side of the sealing portion.

In the secondary battery pouch according to the aspect of the present disclosure, the first fusion portion may have a strongest seal strength in the sealing portion, and the second fusion portion may have a weakest seal strength in the sealing portion.

In the secondary battery pouch according to the aspect of the present disclosure, each of the upper sheet and the lower sheet may include a heat fusion layer, a metal layer, and an outer skin layer, the first fusion portion may be configured such that a fusion ratio of the heat fusion layer thereof is largest in the sealing portion, and the second fusion portion may be configured such that a fusion ratio of the heat fusion layer thereof is smallest in the sealing portion.

In the secondary battery pouch according to the aspect of the present disclosure, a total fusion ratio of the heat fusion layers of the sealing portion may be 47 to 72%.

In the secondary battery pouch according to the aspect of the present disclosure, the fusion ratio of the heat fusion layer of the first fusion portion may be 56 to 90%.

In the secondary battery pouch according to the aspect of the present disclosure, the fusion ratio of the heat fusion layer of the second fusion portion may be 24 to 57%.

In the secondary battery pouch according to the aspect of the present disclosure, each of the upper sheet and the lower sheet may include a heat fusion layer, a metal layer, and an outer skin layer, and each of the upper sheet and the lower sheet may be configured such that a thickness of the heat fusion layer is 40 μm, and a total thickness of the metal layer and the outer skin layer is 95 μm.

In the secondary battery pouch according to the aspect of the present disclosure, the first fusion portion may be formed to a thickness of 200 to 225 μm as the heat fusion layer of the first fusion portion is fused.

In the secondary battery pouch according to the aspect of the present disclosure, the second fusion portion may be formed to a thickness of 225 to 250 μm as the heat fusion layer of the second fusion portion is fused.

In the secondary battery pouch according to the present disclosure, by dividing the area of the sealing portion into the first fusion portion and the second fusion portion so that the first and second fusion portions have different sealing forces, when the internal pressure of the secondary battery pouch increases, a part of the inner side of the sealing portion is allowed to be released from a fused state, causing the inner space of the secondary battery pouch to expand, resulting in a reduction in the internal pressure of the secondary battery pouch. Therefore, it is possible to prevent the swelling phenomenon from occurring.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 5A and 5B are enlarged sectional views of a sealing portion according to an embodiment of the present disclosure.

DETAILED DESCRIPTION OF THE INVENTION

Figure 1:
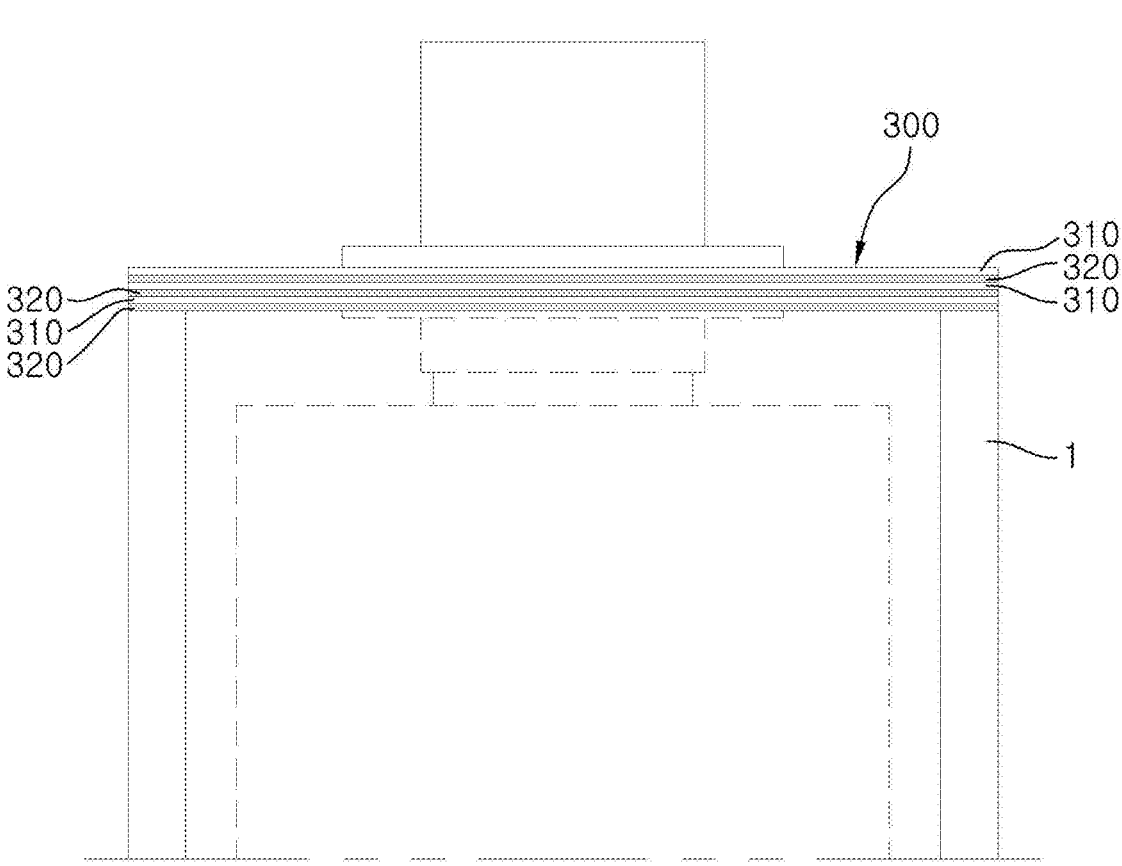
FIG. 1 is a plan view of a secondary battery pouch according to an embodiment of the present disclosure.

The above and other objectives, features, and other advantages of the present disclosure will be more clearly understood from the following detailed description and preferable embodiments when taken in conjunction with the accompanying drawings. As for reference numerals associated with parts in the drawings, the same reference numerals will refer to the same or like parts throughout the drawings. Further, it will be understood that, although the terms "first surface", "second surface", "first", "second", etc. may be used only to distinguish one element from another element, these elements should not be limited by these terms. In the following description, details of well-known features and techniques may be omitted to avoid unnecessarily obscuring the present disclosure.

Hereinbelow, an exemplary embodiment of the present disclosure will be described in detail with reference to the accompanying drawings. Throughout the drawings, the same reference numerals will refer to the same or like parts.

FIG. 1 is a plan view of a secondary battery pouch 1 according to an embodiment of the present disclosure.

The secondary battery pouch according to the embodiment of the present disclosure includes a sealing portion 300 formed at an outside of the secondary battery pouch 1 constituting a battery cell, and sealing an inner space of the secondary battery pouch 1. The sealing portion 300 includes a first fusion portion 310 having the smallest thickness in the sealing portion 300 and a second fusion portion 320 having the largest thickness in the sealing portion 300. The first fusion portion 310 and the second fusion portion 320 are continuously formed at least one time alternately in a direction from an innermost side of the sealing portion 300 in contact with the inner space of the secondary battery pouch 1 to an outer side of the sealing portion 300.

In the secondary battery pouch 1 according to the embodiment of the present disclosure, the sealing portion 300 is formed by fusion of an upper sheet 100 and a lower sheet 200, and the innermost side of the sealing portion 300 has the second fusion portion 320.

In the secondary battery pouch 1 according to the embodiment of the present disclosure, the first fusion portion 310 is configured to have the smallest thickness in the sealing portion 300, and the second fusion portion 320 is configured to have the largest thickness in the sealing portion 300.

The secondary battery pouch 1 according to the embodiment of the present disclosure is configured to increase the volume of the inner space of the secondary battery pouch 1 constituting the battery cell by the mechanism of stepwise sealing release, thereby preventing an increase in internal pressure due to gas generated inside the secondary battery pouch 1, resulting in preventing venting or swelling.

The secondary battery pouch 1 according to the embodiment of the present disclosure is composed of an upper pouch and a lower pouch. The upper pouch is configured as the upper sheet 100, and the lower pouch is configured as the lower sheet 200. In addition, the secondary battery pouch 1 includes the sealing portion 300 formed by fusion of the upper sheet 100 and the lower sheet 200.

The area of the sealing portion 300 is divided into portions having different seal strengths. The sealing portion 300 includes the first fusion portion 310 having the strongest seal strength in the sealing portion 300 and the second fusion portion 320 having the weakest seal strength in the sealing portion 300. Referring to FIG. 1, the first fusion portion 310 and the second fusion portion 320 are continuously formed at least one time alternately in the direction from the innermost side of the sealing portion 300 in contact with the inner space of the secondary battery pouch 1 to the outer side of the sealing portion 300. Therefore, when gas is generated inside the secondary battery pouch 1 and the internal pressure of the secondary battery pouch 1 increases to equal to or greater than a certain level, the sealing of the second fusion portion 320 formed at the innermost side of the sealing portion 300 in contact with the inner space of the secondary battery pouch 1 is released, thereby increasing the volume of the inner space of the secondary battery pouch 1. Thereby, the internal pressure of the secondary battery pouch 1 decreases, resulting in reducing the possibility that a swelling problem or a venting problem may occur in the secondary battery pouch 1.

Figure 2:
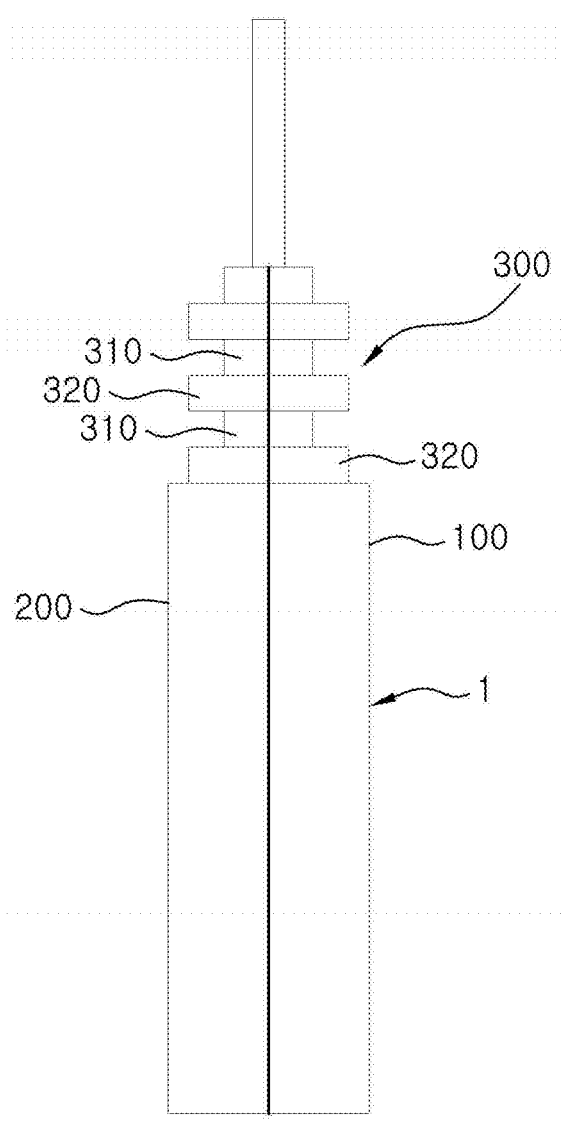
FIGS. 2 and 3 are sectional views of the secondary battery pouch according to the embodiment of the present disclosure.

Referring to FIGS. 1 and 2, it can be seen that the second fusion portion 320 is formed at the innermost side of the sealing portion 300, i.e., the innermost side of the sealing portion 300 in contact with the inner space of the secondary battery pouch 1. If an inner side of the secondary battery pouch 1 is excessively fused to form an excessive sealing force, there is a possibility that a PP layer (heat fusion layer to be fused in the case of the sealing portion 300), which is a polymer resin layer of a sheet, may melt and flow down, and this PP layer melting and flowing down may cause an insulation resistance failure to occur. Therefore, in consideration of the insulation resistance, the second fusion portion 320 having a small sealing force is formed at the inner side of the secondary battery pouch 1.

The process of increasing the inner space of the secondary battery pouch 1 will be described in detail as follows. When the internal pressure of the inner space increases to equal to or greater than a certain level, the sealing of the innermost second fusion portion 320 of the sealing portion 300 is released, causing the upper sheet 100 and the lower sheet 200 to be separated from each other. Thereby, the inner space of the secondary battery pouch 1 expands to a portion where the sealing is released. If the internal pressure of the secondary battery pouch 1 increases again afterwards and thereby the internal pressure is formed at equal to or greater than a certain level, the sealing of the first fusion portion 310 formed at an inner side of the sealing portion 300 is released, and at the same time, the sealing of an adjacent second fusion portion 320 is released. As this process is repeatedly performed, the volume of the inner space of the secondary battery pouch 1 gradually increases in a stepwise manner, which can effectively suppress an increase in the internal pressure of the secondary battery pouch 1.

Referring to FIG. 2, the first fusion portion 310 and the second fusion portion 320 are configured to have different thicknesses. The sealing force of the sealing portion 300 varies depending on the degree to which the upper sheet 100 and the lower sheet 200 are fused in the sealing portion 300. Therefore, the first fusion portion 310 having a high degree of fusion has the smallest thickness in the sealing portion 300, and the second fusion portion 320 having a low degree of fusion has the largest thickness in the sealing portion 300.

Figure 3:
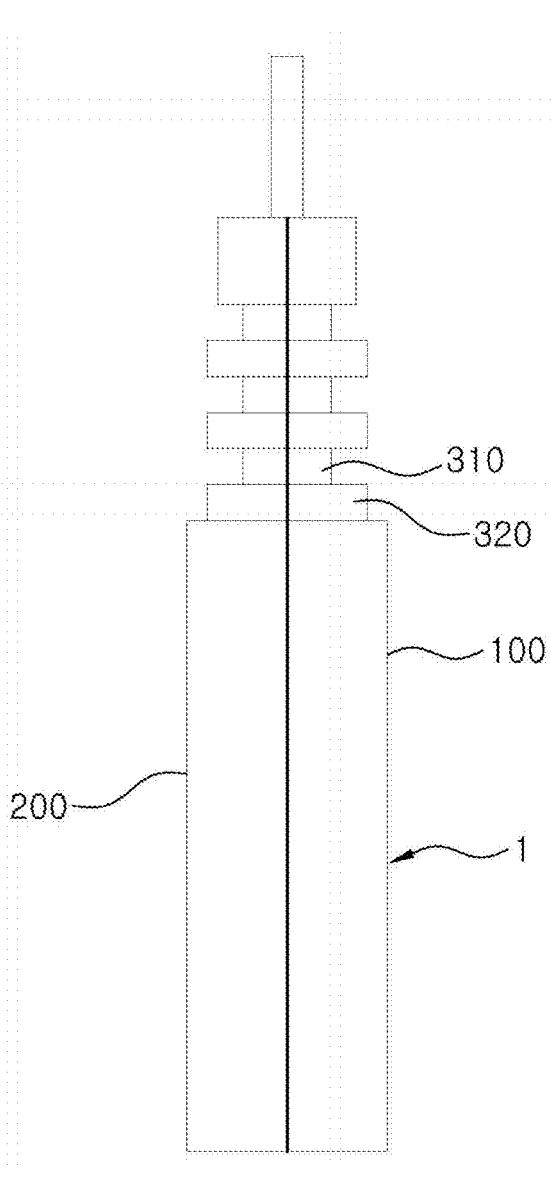

Referring to FIG. 2, the sealing portion 300 is configured to include the first fusion portion 310 and the second fusion portion 320 that are continuously formed from the inner side of the sealing portion 300 to an outermost side thereof. However, the present disclosure is not limited thereto. For example, as illustrated in FIG. 3, the sealing portion 300 may be configured to include the continuously formed first fusion portion 310 and second fusion portion 320 and a remaining portion. Here, the remaining portion of the sealing portion 300 may be a fusion portion having a degree of fusion corresponding to an intermediate value between the degree of fusion of the first fusion portion 310 and the degree of fusion of the second fusion portion 320.

Figure 4:
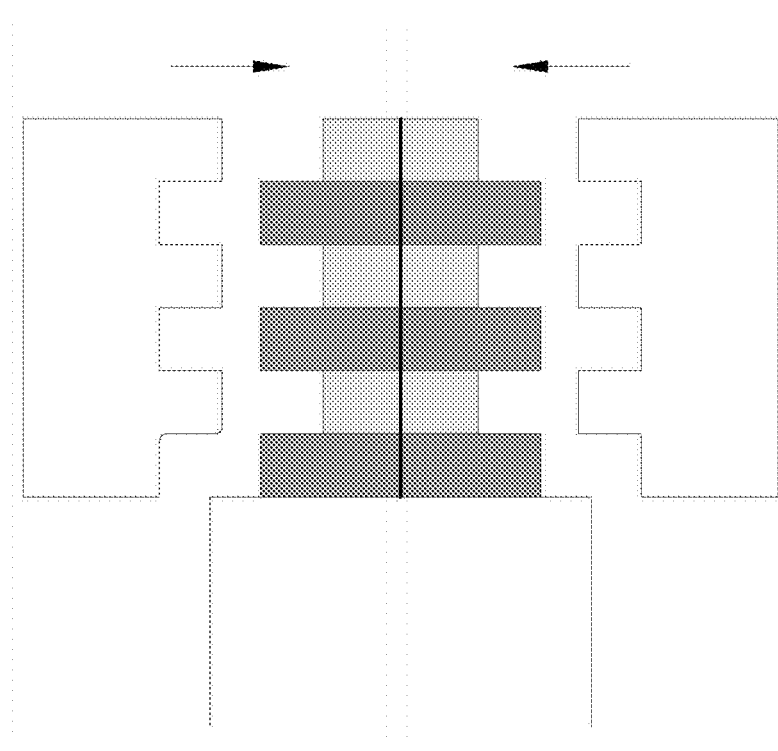
FIG. 4 is a process diagram of the secondary battery pouch according to the embodiment of the present disclosure.

Referring to FIG. 4, a process diagram for variably controlling the thickness of the sealing portion 300 is illustrated. During the process, as illustrated in FIG. 4, the first fusion portion 310 and the second fusion portion 320 of the sealing portion 300 are formed using stepped plates pressing the sealing portion 300.

In the secondary battery pouch 1 according to the embodiment of the present disclosure, each of the upper sheet 100 and the lower sheet 200 includes a heat fusion layer, a metal layer, and an outer skin layer. The first fusion portion 310 is configured such that the fusion ratio of the heat fusion layer 311 thereof is the largest in the sealing portion 300, and the second fusion portion 320 is configured such that the fusion ratio of the heat fusion layer 321 thereof is smallest in the sealing portion 300.

The secondary battery pouch 1 according to the present disclosure includes the upper sheet 100 and the lower sheet 200, and each of the upper sheet 100 and the lower sheet 200 has a laminated structure. The upper sheet 100 and the lower sheet 200 may be made of the same material, but may be made of different materials. However, each of the upper sheet 100 and the lower sheet 200 includes the heat fusion layer, the metal layer, and the outer skin layer. Each of the upper sheet 100 and the lower sheet 200 may further include other layers. For example, each of the upper sheet 100 and the lower sheet 200 may further include an adhesive layer between the heat fusion layer and the metal layer, but is not limited thereto.

In the present disclosure, the heat fusion layer is a polymer resin layer, and the material thereof may be, but is not particularly limited to, a polymer resin generally used as a heat fusion layer for sealing a pouch for a secondary battery. For example, as the material of the heat fusion layer according to the present disclosure, a polyolefin-based polymer or a copolymer of polyolefin and acrylic acid may be used. Preferably, as the material of the heat fusion layer according to the present disclosure, a copolymer of polyethylene, polypropylene, chlorinated polypropylene, and ethylene propylene, a copolymer of polyethylene and acrylic acid, or a copolymer of polypropylene and acrylic acid may be used.

The heat fusion layer according to the present disclosure is prevented from being exposed to the outside of the secondary battery pouch 1 by the metal layer. Therefore, the heat fusion layer according to the present disclosure does not come into direct contact with the outside of the secondary battery pouch 1. In addition, the metal layer according to the present disclosure is configured such that the heat fusion layer is laminated on an inner side thereof. Therefore, the metal layer does not come into contact with terminals of the secondary battery, and the heat fusion layer has a sufficient thickness to have insulation resistance, so that there is no risk of current leakage.

As the fusion ratio of the heat fusion layer increases, the sealing force of the sealing portion 300 increases. Therefore, by configuring the heat fusion layer 311 of the first fusion portion 310 to have the largest fusion ratio in the sealing portion 300, and by configuring the heat fusion layer 321 of the second fusion portion 320 to have the smallest fusion ratio in the sealing portion 300, it is possible to enable the sealing portion 300 to have a sealing force formed in a stepwise manner.

TABLE 1

| | First Fusion Portion (μm) | Second Fusion Portion (μm) | Fusion Ratio of Sealing Portion (%) | Sealing Force (N) | Gas Generation Amount (%) | Device Lifespan (Day) | Insulation Resistance (After 100 Cycles) |
|---|---|---|---|---|---|---|---|
| Comparative Example 1 | 225 | — | 56 | 1800 | 3 | 210 | 1000 MΩ |

TABLE 1-continued

| | First Fusion Portion (μm) | Second Fusion Portion (μm) | Fusion Ratio of Sealing Portion (%) | Sealing Force (N) | Gas Generation Amount (%) | Device Lifespan (Day) | Insulation Resistance (After 100 Cycles) |
|---|---|---|---|---|---|---|---|
| Comparative Example 2 | 200 | — | 87 | 2200 | 3.4 | 240 | <100 MΩ |
| Comparative Example 3 | 225 | 250 | 40 | 1300 | 3 | 210 | 1000 MΩ |
| Example 1 | 225 | 250 | 40 | 1300 | 3 | 210 | 5000 MΩ |
| Example 2 | 225 | 240 | 47 | 1100 | 3.4 | 240 | 3000 MΩ |
| Example 3 | 200 | 250 | 56 | 1100 | 4.3 | 300 | 5000 MΩ |
| Example 4 | 200 | 225 | 72 | 1400 | 3.9 | 270 | 1000 MΩ |

In the secondary battery pouch 1 according to the embodiment of the present disclosure, each of the upper sheet 100 and the lower sheet 200 is composed of the heat fusion layer, the metal layer, and the outer skin layer. Each of the upper sheet 100 and the lower sheet 200 is configured such that the thickness of the heat fusion layer is 40 μm, and the total thickness of the metal layer and the outer skin layer is 95 μm.

Table 1 illustrates how much the amount of gas generated inside the secondary battery pouch 1 increases and how the device lifespan varies according to the thickness formation of the first fusion layer 310 and the second fusion layer 320. Referring to the experimental conditions of Table 1, in each of the upper sheet 100 and the lower sheet 200, the heat fusion layer has a thickness of 40 μm, and the metal layer and the outer layer have a total thickness of 95 μm, so that the thicknesses of the first fusion layer 310 and the second fusion layer 320 vary according to the degree to which the respective heat fusion layers are melted and fused during the formation of the sealing portion 300. As an experimental condition, the width ratio of the first fusion layer 310 to the second fusion layer 320 is constantly set to 1:1.

A condition that can be preferably used in the present disclosure is that the gas generation amount is increased 11 3.4% and the device lifespan is equal to or greater than 240 days. Therefore, Examples 2, 3 and 4 may correspond to an embodiment of the present disclosure, and most preferably, Embodiment 3 may correspond to an embodiment of the present disclosure.

In the secondary battery pouch 1 according to the embodiment of the present disclosure, the total fusion ratio of the heat fusion layers of the sealing portion 300 is 47 to 72%.

When the total fusion ratio of the heat fusion layers of the sealing portion 300 is 47 to 72%, based on this range of values, the amount of gas that can be generated while the sealing of the sealing portion 300 is released increases by equal to or greater than 3.4%, and a device lifespan of equal to or greater than 240 days is obtained.

In Table 1, Comparative Examples 1 and 2 are examples in which the thickness of the sealing portion 300 is uniform. In Comparative Examples 1 and 2, it can be seen that there is a problem in that the gas generation amount increases by only 3% or the insulation resistance is equal to or less than 100 MΩ. On the other hand, in Examples 2, 3, and 4 of the present disclosure, it can be seen that the gas generation amount is equal to or greater than 3.4%, and the device lifespan is equal to or greater than 240 days. As a result, the total fusion ratio of the sealing portion 300 may be 47 to 72%. When the total fusion ratio of the sealing portion 300 is less than 47%, the overall sealing force may decrease, with the result that the gas in the secondary battery pouch 1 may be easily released, thereby reducing the device lifespan. On the other hand, when the total fusion ratio of the sealing portion 300 exceeds 72%, the minimum gas internal pressure for releasing the gas in the secondary battery pouch 1 to outside may increase, resulting in a reduction in the device lifespan and the gas generation amount. Since the device lifespan extension and the gas generation amount of Example 3 are most desirable, the total fusion ratio of the sealing portion 300 is preferably 56%.

In the secondary battery pouch 1 according to the embodiment of the present disclosure, the fusion ratio of the heat fusion layer 311 of the first fusion portion 310 is 56 to 90%.

In the secondary battery pouch 1 according to the embodiment of the present disclosure, the first fusion portion 310 is formed to a thickness of 200 to 225 μm as the heat fusion layer 311 of the first fusion portion 310 is fused.

When the fusion ratio of the heat fusion layer 311 of the first fusion portion 310 is 56 to 90%, based on this range of values, the amount of gas that can be generated while the sealing of the sealing portion 300 is released increases by equal to or greater than 3.4%, and a device lifespan of equal to or greater than 240 days is obtained. When the fusion ratio of the heat fusion layer 311 of the first fusion portion 310 is less than 56%, the overall sealing force may decrease, with the result that the gas in the secondary battery pouch 1 may be easily released, thereby reducing the device lifespan. On the other hand, when the fusion ratio of the heat fusion layer 311 of the first fusion portion 310 exceeds 90%, the heat fusion layer 311 of the first fusion portion 310 may melt and flow down due to excessive fusion, resulting in an insulation resistance failure.

Figure 5A:
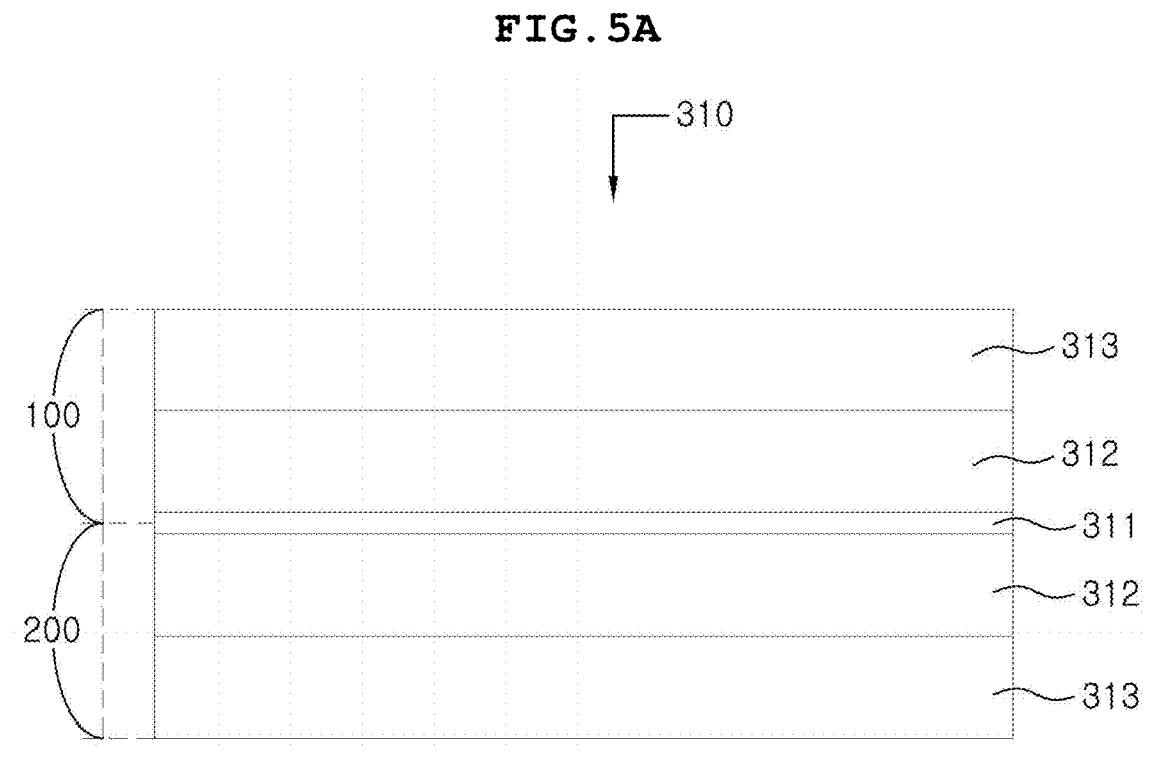

In Examples 2 to 4, the first fusion portion 310 has a thickness of 200 to 225 μm. When the thickness of the first fusion portion 310 is less than 200 μm, the first fusion portion 310 may easily melt and flow down, resulting in a reduction in the insulation resistance. On the other hand, when the thickness of the first fusion portion 310 exceeds 225 μm, the first fusion portion 310 may fail to perform the role of performing stepwise sealing release of the present disclosure due to its weak seal strength. The meaning that the first fusion portion 310 has a thickness of 200 μm means that the 40 μm heat fusion layer of each of the upper sheet 100 and the lower sheet 200 was melted to 5 μm. In addition, the meaning that the first fusion portion 310 has a thickness of 225 μm means that the 40 μm heat fusion layer of each of the upper sheet 100 and the lower sheet 200 was melted to 17.5 μm. That is, as illustrated in FIG. 5A, it is preferable that the fusion ratio of the heat fusion layer 311 of the first fusion portion 310 is 56 to 90%. Based on Example 3, it is most preferable that the fusion ratio of the heat fusion layer 311 of the first fusion portion 310 is 87.5%.

In the secondary battery pouch 1 according to the embodiment of the present disclosure, the fusion ratio of the heat fusion layer 321 of the second fusion portion 320 is 24 to 57%.

In the secondary battery pouch 1 according to the embodiment of the present disclosure, the second fusion portion 320 is formed to a thickness of 225 to 250 μm as the heat fusion layer 321 of the second fusion portion 320 is fused.

When the fusion ratio of the heat fusion layer 321 of the second fusion portion 320 is 24 to 57%, based on this range of values, the amount of gas that can be generated while the sealing of the sealing portion 300 is released increases by equal to or greater than 3.4%, and a device lifespan of equal to or greater than 240 days is obtained.

Figure 5B:
Figure 5B:
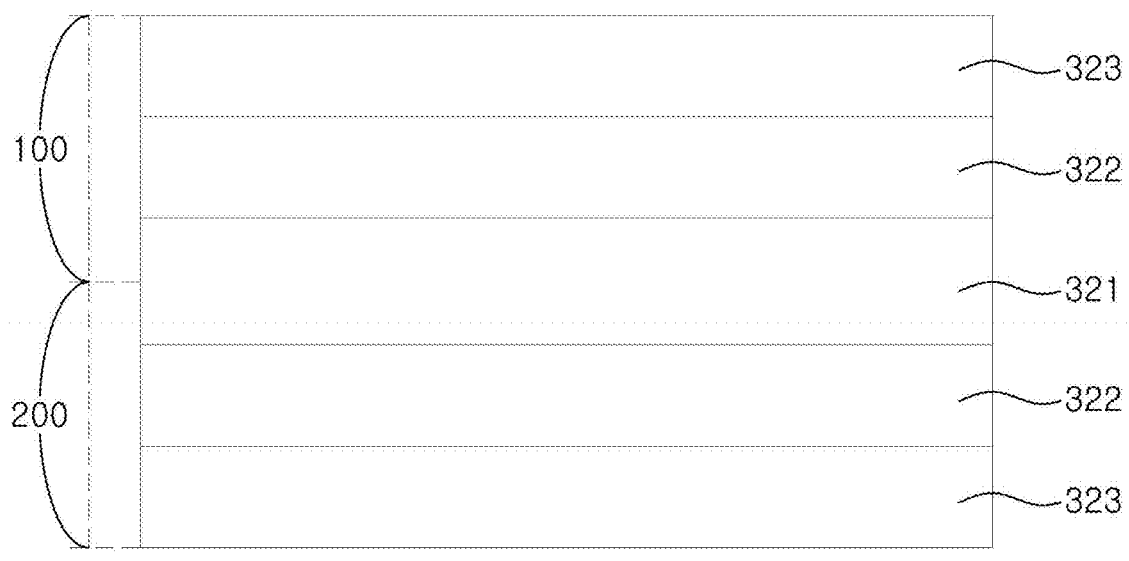

In Examples 2 to 4, the second fusion portion 320 has a thickness of 225 to 250 μm. When the thickness of the second fusion portion 320 is less than 225 μm, there is no significant difference in seal strength from the first fusion portion 310, so that the effect of stepwise sealing release of the present disclosure may not appear. On the other hand, when the thickness of the second fusion portion 320 exceeds 250 μm, the seal strength thereof may be weak, with the result that the sealing portion 300 may fail to perform its basic function. The meaning that the second fusion portion 320 has a thickness of 225 μm means that the 40 μm heat fusion layer of each of the upper sheet 100 and the lower sheet 200 was melted to 17.5 μm. In addition, the meaning that the second fusion portion 320 has a thickness of 250 μm means that the 40 μm heat fusion layer of each of the upper sheet 100 and the lower sheet 200 was melted to 30 μm. That is, as illustrated in FIG. 5B, it is preferable that the fusion ratio of the heat fusion layer 321 of the second fusion portion 320 is 24 to 57%. Based on Example 3, it is most preferable that the fusion ratio of the heat fusion layer 321 of the second fusion portion 320 is 25%.

While the present disclosure has been described in conjunction with an exemplary embodiment thereof, it is to be understood that the present description is not intended to limit the present disclosure to those exemplary embodiments but is described for only an illustrative purpose. Therefore, those skilled in the art will appreciate that the disclosure can be modified or changed in various forms without departing from the technical spirit of the disclosure.

Simple modifications or changes of the present disclosure belong to the scope of the present disclosure, and the detailed scope of the present disclosure will be more clearly understood by the accompanying claims.

DESCRIPTION OF THE REFERENCE NUMERALS IN THE DRAWINGS

1: Secondary battery pouch
100: Upper sheet
200: Lower sheet
300: Sealing portion
310: First fusion portion
311: Heat fusion layer of first fusion portion
312: Metal layer of first fusion portion
313: Outer skin layer of first fusion portion
320: Second fusion portion

321: Heat fusion layer of second fusion portion
322: Metal layer of second fusion portion
323: Outer skin layer of second fusion portion

What is claimed is:

1. A secondary battery pouch comprising:
a sealing portion formed at an outside of the secondary battery pouch constituting a battery cell and configured to seal an inner space of the secondary battery pouch, the sealing portion is formed by fusion of an upper sheet and a lower sheet,
wherein the sealing portion comprises:
a plurality of first fusion portions having a first seal strength and extending continuously along a longitudinal direction of the sealing portion disposed with electrode terminals of the battery cell; and
a plurality of second fusion portions having a second seal strength that is weaker than the first seal strength and extending continuously along the longitudinal direction of the sealing portion disposed with the electrode terminals of the battery cell,
wherein the first fusion portions and the second fusion portions are configured to provide stepwise sealing release in response to internal gas pressure increase,
wherein at least one of the second fusion portions is positioned at an innermost side of the sealing portion in contact with the inner space, and
wherein the first fusion portions and the remaining second fusion portions are arranged alternately toward the outer side of the sealing portion.

2. The secondary battery pouch of claim 1, wherein the first fusion portion has a strongest seal strength in the sealing portion, and
the second fusion portion has a weakest seal strength in the sealing portion.

3. The secondary battery pouch of claim 1, wherein each of the upper sheet and the lower sheet comprises a heat fusion layer, a metal layer, and an outer skin layer, and
each of the upper sheet and the lower sheet is configured such that a thickness of the heat fusion layer is 40 μm, and a total thickness of the metal layer and the outer skin layer is 95 μm.

4. The secondary battery pouch of claim 3, wherein the first fusion portion is formed to a thickness of 200 μm to 225 μm as the heat fusion layer of the first fusion portion is fused.

5. The secondary battery pouch of claim 3, wherein the second fusion portion is formed to a thickness of 225 μm to 250 μm as the heat fusion layer of the second fusion portion is fused.

* * * * *